United States Patent
Ossin et al.

(10) Patent No.: US 11,240,651 B2
(45) Date of Patent: Feb. 1, 2022

(54) TRACKING AND THEFT-RECOVERY SYSTEM FOR MOBILE ASSETS

(71) Applicants: Discovery Limited, Sandton (ZA); Cambridge Mobile Telematics, Cambridge, MA (US)

(72) Inventors: Ilan Ossin, Johannesburg (ZA); Hari Balakrishnan, Belmont, MA (US); Lewis David Girod, Arlington, MA (US)

(73) Assignees: Discovery Limited, Sandton (ZA); Cambridge Mobile Telematics, Cambridge, MA (US)

( * ) Notice: Subject to any disclaimer, the term of this patent is extended or adjusted under 35 U.S.C. 154(b) by 46 days.

(21) Appl. No.: 16/025,968

(22) Filed: Jul. 2, 2018

(65) Prior Publication Data

US 2018/0332456 A1 Nov. 15, 2018

Related U.S. Application Data

(62) Division of application No. 15/355,253, filed on Nov. 18, 2016, now Pat. No. 10,015,654.

(Continued)

(51) Int. Cl.
*H04W 4/80* (2018.01)
*H04W 4/029* (2018.01)
(Continued)

(52) U.S. Cl.
CPC ............ *H04W 4/80* (2018.02); *B60R 25/102* (2013.01); *B60R 25/32* (2013.01); *H04W 4/027* (2013.01);
(Continued)

(58) Field of Classification Search
CPC ..... H04W 4/008; H04W 64/006; G01S 19/17; G01S 5/0027; G01S 19/16; G01S 19/48;
(Continued)

(56) References Cited

U.S. PATENT DOCUMENTS 5,963,131 A   10/1999   D'Anelo
9,213,871 B1  12/2015   Diorio et al.
(Continued)

FOREIGN PATENT DOCUMENTS

EP   0919442 A2 *  6/1999   ........... B60R 25/102
EP   0919442 A2    6/1999
(Continued)

OTHER PUBLICATIONS

International Search Report for PCT/IB16/056950 (WO2017/085674) dated Feb. 24, 2017.
(Continued)

*Primary Examiner* — Jianxun Yang
(74) *Attorney, Agent, or Firm* — Fleit Intellectual Property Law; Paul D. Bianco; Gary S. Winer

(57) ABSTRACT

A system for tracking objects includes tracking devices each attached to an object to be tracked and including a short range communications module. A server includes a processor and a memory. A mobile communications device (typically a mobile telephone) includes memory for storing an identification of the mobile device, a long range communication module for communication over a cellular communication network and a short range communications module for receiving short range signals transmitted from tracking devices. The mobile telephone also includes a location determination module to determine the location of the mobile telephone. On receipt of a short range distress signal from a tracking device, a location is obtained from the location module and a signal transmitted to the server (Continued)

including at least the identification of the tracking device, a time of receipt of the short range signal from the tracking device and the determined location of the tracking device when the short range signal was received.

19 Claims, 5 Drawing Sheets

Related U.S. Application Data

(60) Provisional application No. 62/256,861, filed on Nov. 18, 2015.

(51) Int. Cl.
*B60R 25/32* (2013.01)
*B60R 25/102* (2013.01)
*H04W 4/02* (2018.01)
*H04W 64/00* (2009.01)
*H04W 4/40* (2018.01)
*B60R 25/33* (2013.01)

(52) U.S. Cl.
CPC ............ *H04W 4/029* (2018.02); *H04W 4/40* (2018.02); *H04W 64/006* (2013.01); *B60R 25/33* (2013.01)

(58) Field of Classification Search
CPC .. G01C 21/206; G06Q 10/087; G06K 7/0008; H04L 67/10; H04L 67/18; H04L 43/08; H04L 5/0055; H04L 67/125; G08B 5/36; H04B 10/116
See application file for complete search history.

(56) References Cited

U.S. PATENT DOCUMENTS

| | | |
|---|---|---|
| 10,015,654 B2 | 7/2018 | Ossin et al. |
| 10,771,945 B2 | 9/2020 | Ossin et al. |
| 2007/0018820 A1 | 1/2007 | Chand et al. |
| 2007/0102574 A1 | 5/2007 | Frumin |
| 2009/0315679 A1 | 12/2009 | Bauchot et al. |
| 2011/0140884 A1 | 6/2011 | Santiago et al. |
| 2011/0205040 A1* | 8/2011 | Van Wiemeersch .... B60R 25/00 340/426.1 |
| 2012/0139760 A1* | 6/2012 | Bevacqua ......... H04W 12/1206 340/989 |
| 2013/0217332 A1 | 8/2013 | Altman et al. |
| 2015/0154847 A1 | 6/2015 | Oliver |
| 2015/0158461 A1 | 6/2015 | Hess |
| 2016/0101786 A1* | 4/2016 | Johnson ................. G01S 19/34 701/32.4 |
| 2016/0344509 A1* | 11/2016 | Hayman .................. H04K 3/88 |
| 2017/0142543 A1 | 5/2017 | Ossin et al. |
| 2017/0287315 A1 | 10/2017 | Kaur |
| 2018/0324569 A1 | 11/2018 | Ossin et al. |
| 2021/0084473 A1 | 3/2021 | Ossin |

FOREIGN PATENT DOCUMENTS

| | | | |
|---|---|---|---|
| EP | 1522981 A2 * | 4/2005 | ......... G08B 21/0283 |
| EP | 1522981 A2 | 4/2005 | |
| WO | 2006/057804 A2 | 6/2006 | |
| WO | 2010/039741 | 4/2010 | |
| WO | 2011/011405 A2 | 1/2011 | |
| WO | 2011/013084 A1 | 2/2011 | |
| WO | 2011013084 A1 | 2/2011 | |
| WO | 2015166314 A1 | 11/2015 | |
| WO | 2017/085674 A1 | 5/2017 | |

OTHER PUBLICATIONS

Written Opinion for PCT/IB16/056950 (WO2017/085674) dated Feb. 24, 2017.
U.S. Appl. No. 15/355,253, Office Action dated Jul. 24, 2017.
U.S. Appl. No. 15/355,253, response dated Oct. 9, 2017.
U.S. Appl. No. 15/355,253, Final Office Action dated Nov. 28, 2017.
U.S. Appl. No. 15/355,253, dated Feb. 26, 2018.
U.S. Appl. No. 15/355,253, Requirement for Restriction dated Jun. 5, 2017.
U.S. Appl. No. 15/355,253, dated Apr. 12, 2017.
Office action for U.S. Appl. No. 16/025,974 dated Jan. 22, 2020.
Response dated Apr. 21, 2020 for U.S. Appl. No. 16/025,974.
Notice of Allowance, dated May 11, 2020, for U.S. Appl. No. 16/025,974.
Issue Notification dated Aug. 19, 2020, for U.S. Appl. No. 16/025,974.
Office action for Australian application serial No. 2016357641, dated Dec. 4, 2020.

* cited by examiner

TRACKING AND THEFT-RECOVERY SYSTEM FOR MOBILE ASSETS

BACKGROUND OF THE INVENTION

The present application relates to a tracking system for mobile assets, including an option to recover stolen assets, particularly for motor vehicles.

Motor vehicle theft is a significant problem in many parts of the world. Current vehicle tracking devices either make use of a "deep install" black box device that is physically fitted to the vehicle; they also include a wide-area wireless radio frequency (RF) interface such as a cellular radio or some other proprietary radio frequency system for the device to communicate via a communication network with computers that track the location of vehicles. The use of such a network increases the cost of operations of the asset tracking system.

In addition, prior solutions to the theft problem require a human (e.g., the vehicle's owner) to discover that the vehicle has been stolen, to then send a message to an operations center to report theft. Then, in response, the location of the stolen vehicle may be found using the location data periodically sent to a server under the control of the operations center, or sent in response to a query made to the black box in the car. This process may take several hours or even days because of the delay involved in a human discovering that the vehicle may have been stolen.

Moreover, in the field of insurance telematics, an insurer may wish to monitor driving behaviour of a vehicle with the owner's consent, in order to determine how a vehicle is being driven by a driver provide insurance discounts to good drivers and create incentives and programs for safer driving.

This present invention provides an improved asset tracking and theft recovery system that (1) does not mandate a wide-area wireless communication module on the tracking device inside a vehicle, (2) whether or not a wide-area wireless communication module is used on the tracking device, supports the ability to pre-emptively discover within a few minutes of movement that a vehicle is running without the presence of an authorized user of the vehicle (and hence may possibly be in the process of being stolen), and (3) as an option, embeds the ability to monitor the relevant driving behaviour elements required by the insurer without the need to attach the device to the vehicle harness.

SUMMARY OF THE INVENTION

According to the present invention there is provided a tracking device including:
 a short range wireless communication module;
 an accelerometer; and
 a controller connected to the wireless communication module and to the accelerometer so that when an object to which the device is connected in use moves, the movement is detected by the accelerometer and in response thereto the controller waits for a period of time to receive an authentication confirmation message from the mobile communications device, if no authentication confirmation message is received within the period of time the controller controls the communication module to periodically transmit distress messages via the short range wireless communications module.

The short range wireless communication module may be a Bluetooth communication module.

In one example, the tracking device further includes a long range low energy wireless communication module typically in the form of a LoRa (Low Energy Long Range) wireless communication module for communication over a LoRa wireless network or a cellular network.

In one embodiment, the tracking device receives via the long range communication module an activate message from a tracking server and in response thereto the controller activates the short range wireless communication module to transmit periodic distress messages via the short range wireless communications module.

The tracking device may further include a memory for storing a unique identifier of the device and wherein the accelerometer measures the acceleration of the tag and thereby of the vehicle and stores acceleration data in the memory and wherein the controller controls the communication module to transmit a sequence of time stamped acceleration data to a mobile communications device.

In this way the tracking device also provides driving behaviour data.

According to another example embodiment of the present invention there is provided a system for tracking objects including:
 a plurality of tracking devices each attached to an object to be tracked and including a short range communications module;
 a server;
 a mobile communications device including:
  a memory for storing therein an identification of the mobile device;
  a long range communication module for communication over a cellular communication network;
  a short range communications module for receiving short range signals transmitted from tracking devices, the received signal including at least an identification of the tracking device;
  a location determination module to determine the location of the mobile communication device; and
  a processor for:
   on receipt of a short range distress signal from a tracking device, obtaining a location from the location module; and
   transmitting a signal to the server via the long range communication module, the signal including at least the identification of the tracking device, a time of receipt of the short range signal from the tracking device and the determined location of the tracking device when the short range signal was received.

The short range communications module may be a Bluetooth communication module which receives a Bluetooth distress signal from a tracking device.

In one example the mobile communications device is a mobile telephone.

The mobile communications device and the server may both include a long range communications module which enable the mobile communications device and the server to communicate directly with one another.

The serve may further include a memory associated with the server, wherein the server further:
 receives an authentication request from a mobile communications device, the authentication request including an identification of a tracking device and an identification of the mobile communications device from which the request is received;
 accesses the memory to determine if the mobile communications device from which the authentication request is received is an authorised mobile communications device for the tracking device; and if the mobile communications device is an authorised device then transmitting an authentication message back to the mobile communications device via the long range communication modules.

Upon receipt of an authentication message, the mobile communication device transmits a cancel message via the short range communication modules to the tracking device to thereby stop the tracking device from transmitting distress messages.

DESCRIPTION OF THE EMBODIMENTS

The present invention relates to a tracking device and a tracking system within which the device operates.

Referring to the accompanying drawings, the tracking device 10 is shown for use in tracking a motor vehicle 12. However, it will be appreciated that the tracking device 10 could be used to track other suitable assets.

In the illustrated example embodiment, the tracking device 10 is in the form of a tag that typically includes a physical connector (not shown) by means of which the device can be physically attached to a motor vehicle which is to be tracked.

Figure 2:
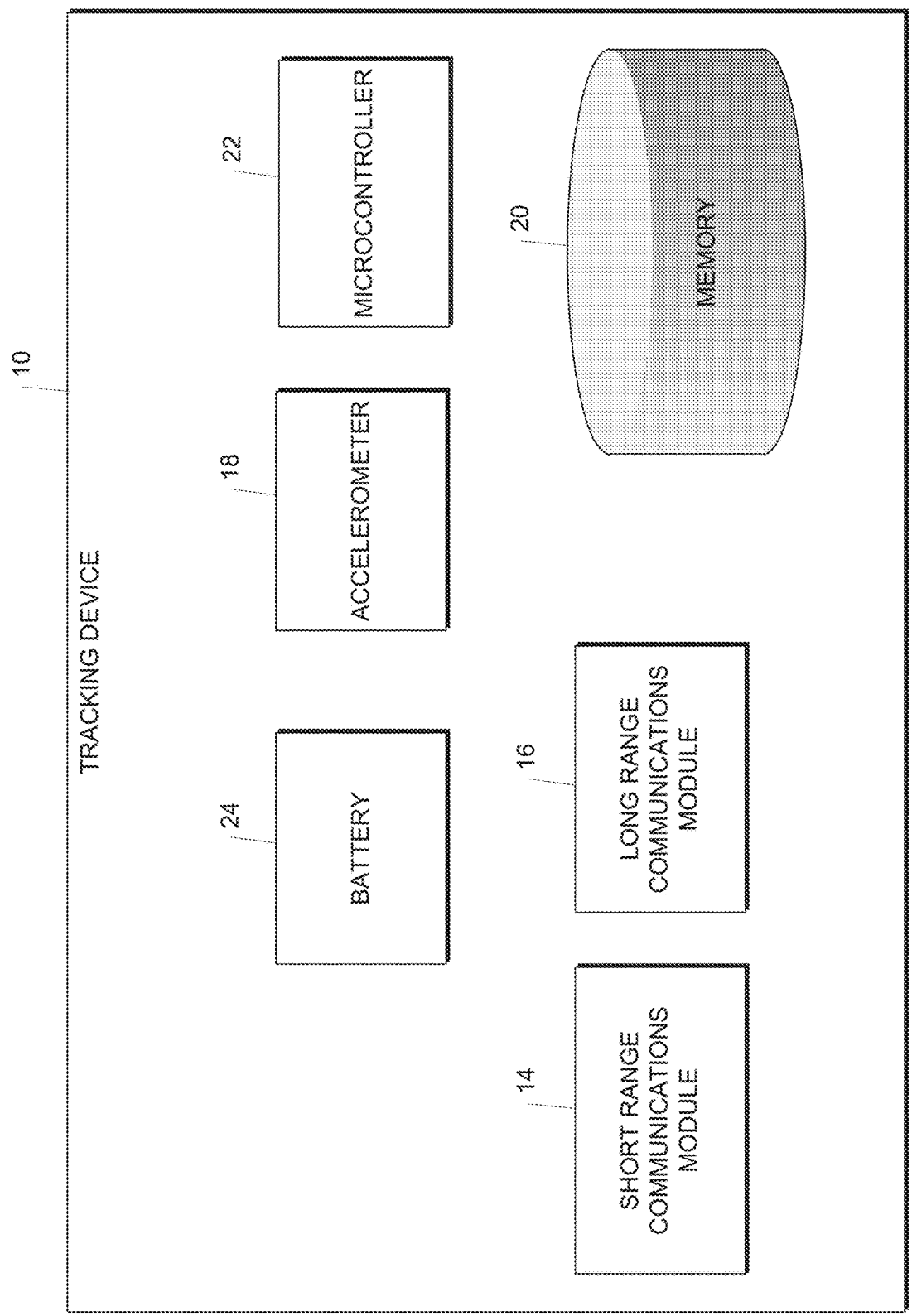
FIG. 2 is a schematic representation of a tracking device used in the tracking system of FIG. 1.

Referring to FIG. 2, the tracking device 10 includes a short range wireless communication module 14 typically in the form of a Bluetooth Low Energy (BLE) communication module.

The tracking device 10 also includes an accelerometer 18, which measures acceleration of the tracking device 10, and thereby measures the acceleration of any object to which the tracking device 10 is connected in use. The function of this accelerometer will be described in more detail below.

The tag may have additional sensors as well, including a gyroscope and compass.

In the preferred embodiment, the tracking device 10 is battery-operated and so includes a battery 24.

The tracking device 10 also includes a memory 20 in which at least a unique identifier of the tracking device 10 is stored.

The tracking device 10 is used to track a stolen object using a plurality of mobile communication devices typically in the form of mobile telephones 26, which are encountered in the vicinity of the stolen object.

By way of overview, in the first example the tracking device 10 uses the short range communication module 14 to transmit a distress signal including an identity of the tracking device 10 obtained from memory 20. The distress messages are then received by mobile communication devices 26, which are used to determine the locations traversed by the tracking device 10 (and therefore of the stolen object), as will be explained in more detail below.

Referring back to FIG. 1, in one example embodiment the object to which the tracking device 10 is connected is a motor vehicle 12. If the motor vehicle is determined to be stolen (this will be explained in more detail below), mobile communications devices in the form of mobile telephones 26 in passing motor vehicles or with people on roadsides or in nearby buildings are typically used to receive BLE distress messages transmitted from the tracking device 10.

The BLE distress message may be received directly by the mobile communications device 26 or may be transmitted from one tracking device 10 to another tracking device 10 (possibly multiple times) before terminating in a mobile communications device 26.

In this example a threshold of allowable hops are set before the signal reaches a mobile communications device 26. Alternatively, or in addition, a time bound may be set, i.e., any number of hops is allowable as long as the current time is not more than T minutes from the origination time of the message. If more than T minutes have elapsed, then the message will be discarded and won't be forwarded further. This is because the information about the stolen object's current location, inferred from a location/positioning module 36 (such as GPS) on the mobile communications device, will not be pertinent if the time difference is too large.

Figure 3:
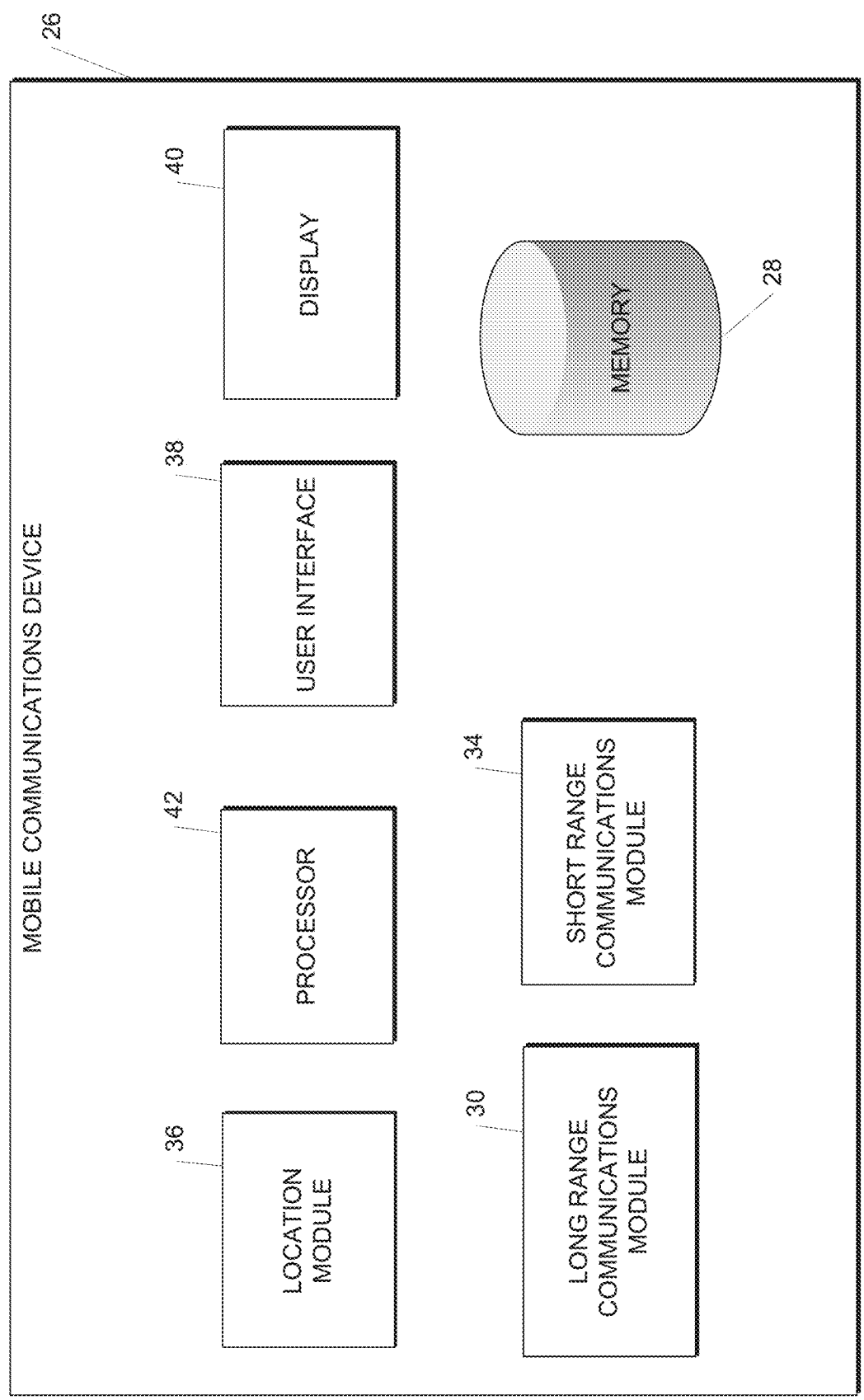
FIG. 3 is a schematic representation of a mobile communications device used in the tracking system of FIG. 1.

In any event, FIG. 3 illustrates the mobile communications device 26 in more detail. It will be appreciated that this device will typically be a so-called smartphone. It may also be a tablet device or a dedicated device purpose-built and installed in commonly-driven areas (e.g., fuel refuelling stations).

The mobile communications device 26 includes a memory 28 for storing therein a unique identifier of the mobile communications device 24.

Figure 1:
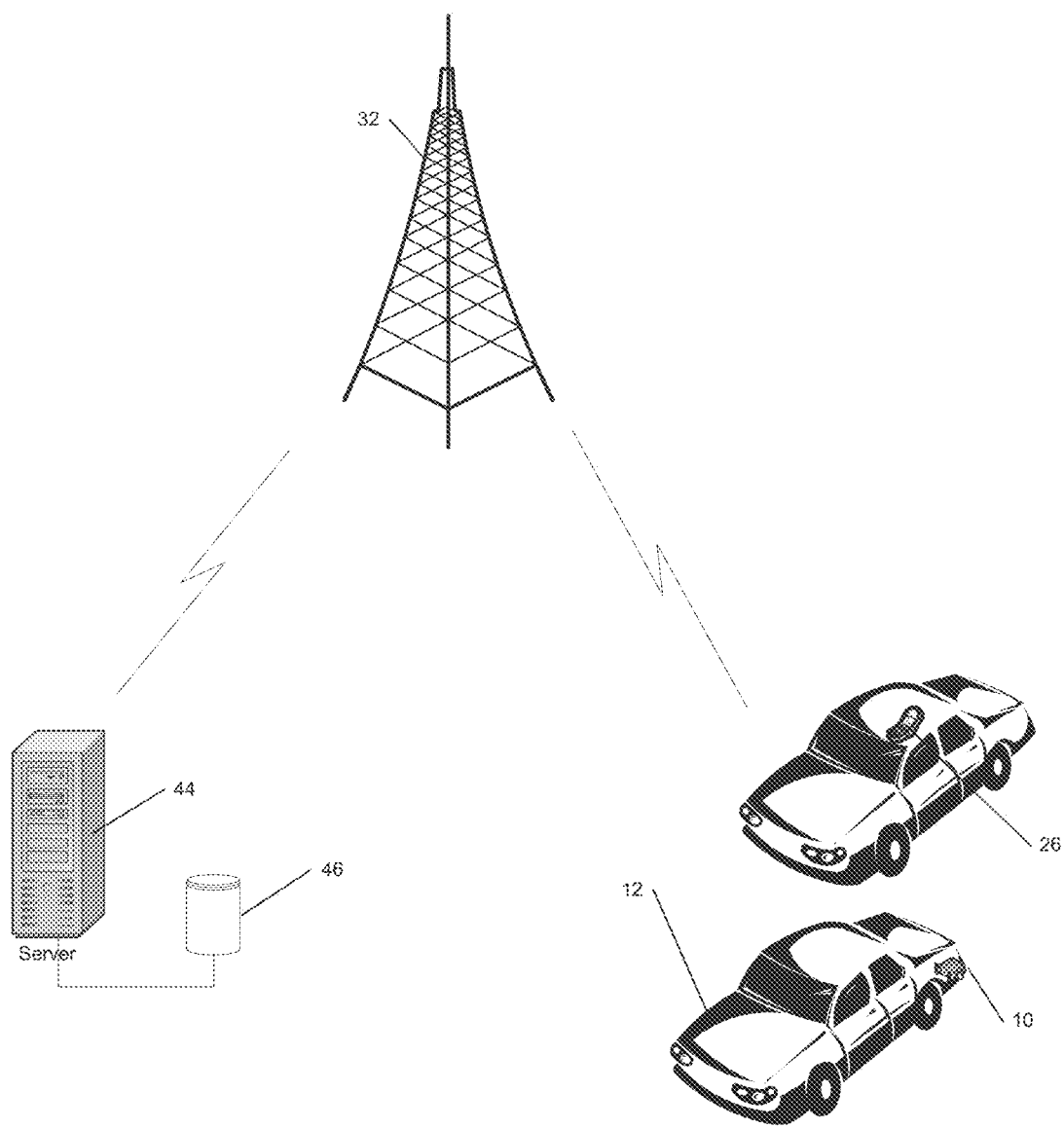
FIG. 1 shows an example tracking system.

A long range communications module 30 is used by the mobile communications device 26 for communication over a cellular communications network 32 (shown in FIG. 1). It could also use a Wi-Fi network or any other data network available on the mobile communications device 26.

A short range communications module 34 is used by the mobile communications device 26 for receiving short range signals transmitted from the tracking device 10.

It will be appreciated that in the illustrated embodiment, the short range communications module 34 is a Bluetooth Low Energy (BLE) communications module.

A location determination module 36 is used to determine the location of the mobile communication device 26. This module 36 is typically a Location Provider (e.g., a global positioning system such as GPS) module that is able to determine the location of the mobile communications device 26 at any given time. It may also be a so-called network location provider that obtains location information using cellular or Wi-Fi signals, or using a combination of GPS and network location.

The mobile communications device 26 typically also includes a user interface 38 for receiving inputs from the user and a display 40 for displaying information to the user.

A processor 42 controls the operation of the mobile communications device 26 so that on receipt of a short range BLE signal containing the unique identifier of a tracking device 10, a location at that time is obtained from the location module 36.

Because the mobile communications device 26 must have been within close proximity to the tracking device 10 to receive the signal transmitted from the tracking device 10, the location of the mobile communications device 26 is in fact substantially the same location as the tracking device 10.

In this way, the location of the tracking device 10 can effectively be determined when a mobile communications device 26 is nearby.

Once a location is determined, a message is transmitted by the mobile communications device 26 via the long range communication module 30 over the cellular network 32 to a server 44 with an associated memory 46.

The message will include at least the received unique identifier of the tracking device 10, a time of receipt of the short range wireless signal from the tracking device 10, and the determined location of the tracking device 10 when the short range signal was received.

Figure 4:
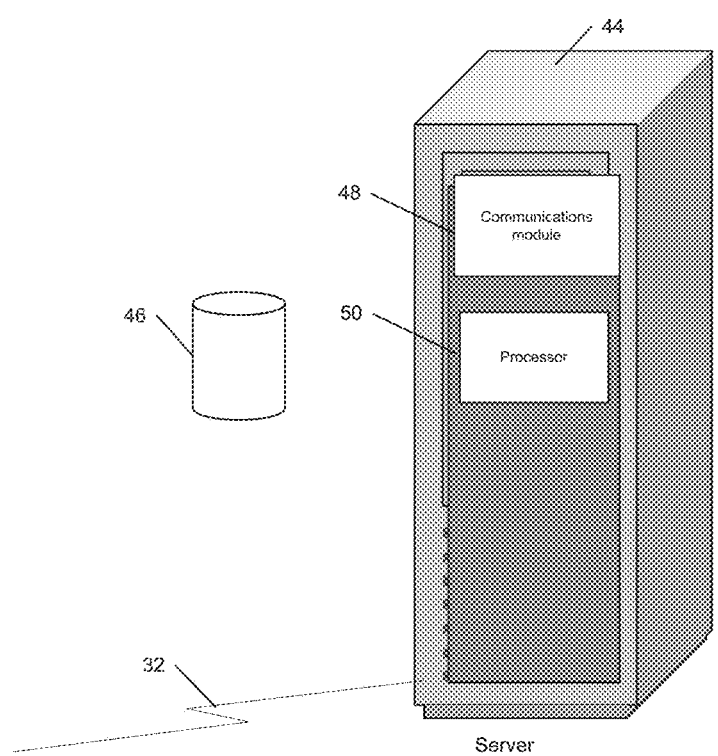
FIG. 4 is a schematic representation of a server used in the tracking system of FIG. 1.

Referring to FIG. 4, the server 44 includes a number of modules.

In one example embodiment, the modules described may be implemented by a machine-readable medium embodying instructions which, when executed by a machine, cause the machine to perform any of the methods described above.

In another example embodiment the modules may be implemented using firmware programmed specifically to execute the method described herein.

It will be appreciated that embodiments of the present invention are not limited to such an architecture, and could equally well find application in a distributed system, or a peer-to-peer, architecture system. Thus the modules illustrated could be located on one or more servers operated by one or more institutions.

In any event, a communications module 48 allows the server 44 to communicate over a communications network 32 (such as the Internet) to the mobile communications device 26.

A processor of the server 50 includes an analysing module that continuously evaluates received messages and in this way is able to track the movement of tracking device 10 via the location information data received.

Thus it will be appreciated that the tracking system of the present invention effectively provides a "crowd-sourced tracking model" that relies on the capability of mobile communications devices in the general vicinity of a tracked object to connect to a tracking device via BLE and to determine the position of itself via GPS.

There are various ways in which the tracking device 10 can be placed in a distressed mode where it is periodically transmitting distress signals.

In a first embodiment, the tracking device 10 includes a long range communication module 16 which is used by the server 44 to switch the device 10 into distress mode.

The long range wireless communication module 16 is typically in the form of a cellular or LoRa wireless communication module or equivalent.

The long-range wireless communication module 16 receives an "activate" message transmitted from the server 44 and in response thereto the processor 22 controls the tracking device 10 to put the device in a distressed mode whereby the short range wireless communication module 14 transmits messages or transmits messages more frequently indicating that the asset must be tracked and found.

In this embodiment, in addition to using BLE transmissions received by a nearby mobile communications device 26 to determine the location of the tracking device 10, the location of the tracking device 10 can be approximately obtained and tracked using location information inferred from long range wireless signals of the cellular network, LoRa, or equivalent. In this scenario the short range and long range communication functionality of the tracking device 10 are used to complement one another.

In this example embodiment, the security protocol is further enhanced in that the identity of a "master" mobile communication device (e.g., the smartphone belonging to the owner or other authorized users of the vehicle, which would run an application capable of processing signals sent by the tracking device 10) will be stored in the memory 20 of the tracking device 10. Should the vehicle then be moving and the "master" mobile communication device not be present in the vehicle, the tracking device 10 using the LoRa module 16 would be able to initiate a distress signal to the server 44 and turn the tracking device into "distress mode."

In one example, the controller 22 checks, via the short range wireless communication module 14, if a master mobile communications device is located within range of the tracking device.

If a master mobile communications device is located within range of the tracking device (e.g., because it connects to the tracking device over BLE), then the controller 22 will not activate the short range communication module 14 to periodically transmit short range wireless messages.

If a master mobile communications device is not located within range of the tracking device then the controller 22 will transmit a message via the long range communication module 16 requesting from a server a status of the object to which the device is attached and then receiving a status message back from the server.

In addition, the following is an example of a policy applied to the system that would enable tracking of the module in this embodiment:

1) The tracking device 10 would communicate with the in-vehicle mobile smartphone each time the vehicle starts to move based on a movement algorithm embedded in the device 10.

2) After T minutes into the trip the tracking device 10 using the long range communication network 16 would initiate a connection to check in with the server 44 to determine if that vehicle has been reported stolen. Should this be the case, the tracking device 10 is put into the distress mode whereby it will send more frequently the Bluetooth Low Energy ID packets and may communicate more frequently via the long-range communications infrastructure in order to provide information to triangulate the tracking device's location.

3) All receiving mobile communication devices 26 are also instructed configured to "read" these distress signals and report the location to the server 44.

In another embodiment the device 10 operates with only the short-range communications module 14 operating in conjunction with a master mobile communications device as follows. It will be appreciated that this embodiment will have lower costs of implementation and operations compared to using the long-range communications capability.

When the vehicle starts moving the tracking device 10 will attempt to authenticate with a mobile device/smartphone 26 in the vehicle.

The movement of the vehicle is detected as described above using a movement algorithm embedded in the device 10 based on the magnitude of detected acceleration exceeding a threshold for a certain period of time and this identifies that the vehicle is being driven.

Once movement is detected, the device 10 will communicate with the mobile device 26 via the short range mobile communications modules 14 and 32 and the tracking device 10 will transmit its unique identifier to the mobile communications device 26.

It will be appreciated that in order for this to occur a software application is executing on the processor 42 of the mobile communications device 26.

By way of this executable application, the mobile communications device 26 may authenticate the tracking device 10 by comparing the received identification with an identification stored in memory 20. If these match, then an "authenticated" message is transmitted back to the tracking device 10.

Alternatively, or in addition, the mobile communications device 26 will check with the server 44 if it is allowed to authenticate the device 10. In one example, this is done by the mobile device 26 transmitting the serial number of the device 10 via the mobile communication device's long-range communications module 30, together with an identification of the mobile communications device 26 to the server 44.

Upon receipt of the data via the communications module 48, the server 44 will access the memory 46 to ascertain if the tracking device 10 is associated with the mobile communications device 26 from which the data has been received.

If the device 10 is associated with the mobile device 26, a message is transmitted back to the mobile device 26 confirming this fact.

Upon receipt of this data message, the mobile device 26 communicates with the device 10 confirming this authentication.

If the device 10 does not receive an authentication message, it will enter distress mode.

The operation of the system in distress mode is time-based: if a message is not received within a specific time, then the tracking device 10 will enter distress mode.

In distress mode, the device 10 will transmit distress messages periodically as described above.

A more detailed explanation of this embodiment is as follows.

The accelerometer 18 on the tracking device 10 detects motion of the object based on the magnitude of detected acceleration exceeding a threshold for a certain period of time and this identifies that the vehicle is being driven.

Once movement is detected, the device 10 will communicate with the mobile communications device 26 via the short range mobile communications modules 14 and 32. In the example of using the Bluetooth communication protocol, a Bluetooth connection is established between the device 10 and the mobile device 26. Communication between the device 10 and the mobile communications device 26 will now occur via this established Bluetooth connection.

After T minutes without receiving an authenticated "cancel alarm" command (described below), the tracking device 10 will begin transmitting a "distress message" that includes the unique identifier of the tracking device 10.

This distress message is transmitted in one of two ways:
a. In one embodiment, it is transmitted using the highest power setting available on the short-range wireless communication module 14.
b. In another embodiment, it is transmitted using the long-range wireless communication module 16 if such a module is present on the tracking device
c. It may also be sent on both if both options are available.

The transmission of distress messages is cancelled if a mobile communications device 26 connects to the tracking device 10 and transmits an authenticated and valid "cancel alarm" command to the tracking device 10.

If such a message is received by tracking device 10 via the BLE communications module, then the tracking device 10 will cease transmitting distress messages for as long as the mobile communications device 26 remains connected to the tracking device 10 via the short range communications protocol as described above.

As explained below, only mobile communication devices belonging to authorized owners or operators of the vehicle are able to send a valid and authenticated "cancel alarm" message.

The following method is used to produce authenticated and valid "cancel alarm" messages for the mobile communications device 26 to send to the tracking device 10 over a connection to the short-range wireless module (BLE) 14. As the mobile communications device 26 is assumed to be untrusted, the method relies on a shared security secret between the tracking device 10 and the server 44.

This is described as follows. Suppose a mobile communications device 26 belonging to a user authorized to be present in the vehicle while it is driving.

The mobile communications device 26 connects to the tracking device 10 via the short-range wireless module 14 (BLE).

When the tracking device 10 accepts the connection it generates a one-time connection nonce (i.e., a single-use identifier) that is valid for the duration of the connection and sends it to the connected mobile communications device 26.

The mobile communications device 26 sends a request to the server 44 via the long range communications modules 30 and 48 containing the unique identifier of the tracking device 10 and the connection nonce, as well as the user's credentials that are available to the mobile communications device (in the mobile application being used).

The server 44 verifies the user's credentials and looks up the mobile communications device 26 and tracking device 10 in its database. If the mobile communications device 26 is authorized to cancel an alert on the specified tracking device 10, then it constructs a valid "cancel alarm". This message is signed with a signature that incorporates a hash of the following information:
a. the one-time connection nonce
b. the unique identifier of the tracking device
c. the text of the message itself
d. the signature is signed with a symmetric secret key shared by the server 44 and the tracking device 10, that is unique to the tracking device 10.

The signed message is returned to the mobile communications device 26, and the mobile device transmits the message to the tracking device 10 to cancel the alarm.

The alarm remains suppressed only as long as the authorized mobile communications device remains connected.

On a new connection, a new nonce is chosen, invalidating any previously transmitted "cancel alarm" messages.

Note that the "cancel alarm" method is orthogonal to the method used to send distress messages. The latter may be sent via a short-range wireless module 14 or long-range module 16. In both cases, the "cancel alarm" method is useful to transmit distress messages proactively and only when the vehicle is not being used by an authorized user.

Thus it will be appreciated that in all cases, the asset (motor vehicle) 12 will be in distress mode and moving (being driven) with the BLE module 14 periodically transmitting messages. Each message will include at least the identification of the tracking device 10 obtained from the memory 20.

This tracking device 10 now becomes discoverable by any suitable device which is close enough to the tracking device 10 to receive the message transmitted from the tracking device 10 via its short-range communication module (e.g., BLE).

Any smartphones, tablets, or other devices running an application that embeds in it the ability to process these distress messages will be listening for this specific distress mode as described above, and will send their locations when they pick up a tag in its vicinity in this distressed mode back to the server 44 via the mobile communications network. This capability enables "crowd searching", i.e., the ability to detect and recover theft using devices carried and used by people in their daily lives. Of course, some of the mobile communication devices could also be dedicated infrastructure devices located in locations that are commonly driven.

Should a tag be in distressed mode for a number of days it can turn itself off to preserve the battery life on the device 10. It may also be done if the user is not complying, i.e., does not drive with their phone or keeps the short-range radio (e.g., Bluetooth) off on their mobile communications device 26.

Additionally, command messages will be able to be passed through the crowd to the device 10 as well, i.e., to turn tags in and out of distress mode.

Figure 5:
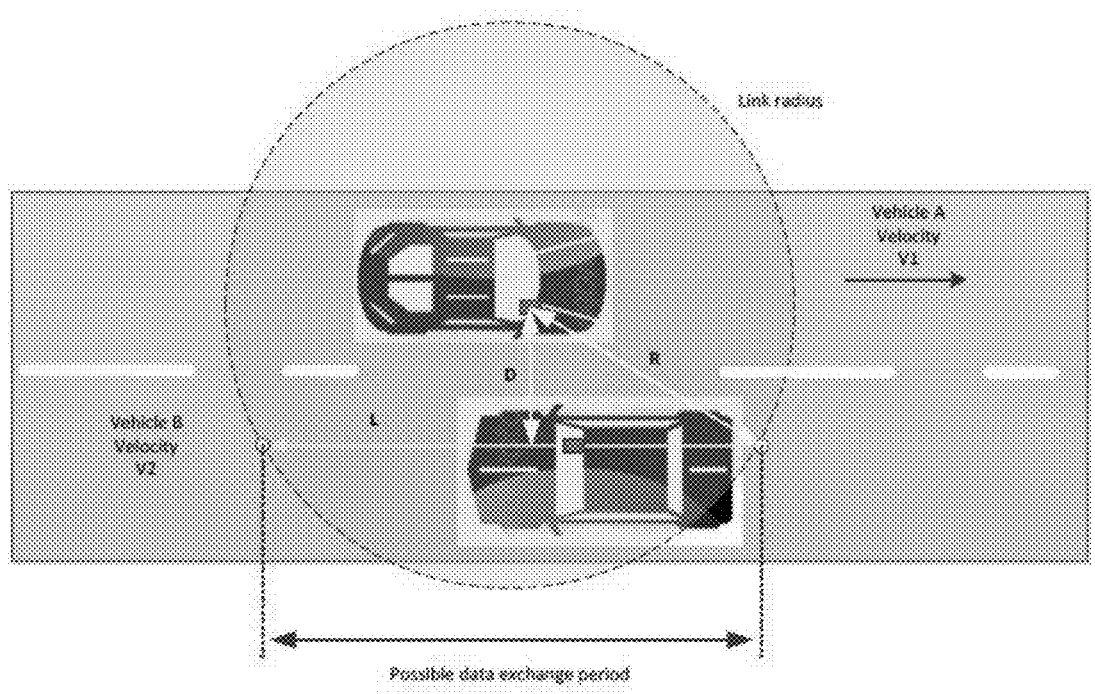
FIG. 5 shows two vehicles passing one another on a standard residential road as per a road test that was conducted to evaluate the present invention.

Referring to FIG. 5, a road test was conducted to evaluate the present invention with two vehicles on a standard residential road. Several scenarios may be considered for this model but the one tested was of two vehicles passing each other in different directions on a road.

A BLE-USB device from Texas Instruments™ was used as the recording device. This device is based on the CC2540 from Texas Instruments™. Data recording was done with SmartRF Packet Sniffer from Texas Instruments™ with a filter set on advertisement type and address.

The BLE modules were first placed in both vehicles front window area where good line-of-sight could be achieved. This was chosen to verify the ranges claimed by the hardware manufacturer. Both vehicles traveled at a speed of 60 km/h.

In the second test, one module was placed on the central console between the front seats where a phone might normally be placed and the second module was placed on top of the sun visor. This presented slight interference by the vehicle's body but also worked.

In a third test, module one was again on the central console and the second was placed in the glove box of the second vehicle. This would represent a more realistic scenario for the location of the tracking device 10 in the vehicle.

The last results correspond to a 50 m link radius when placed in the glove box. The data shows 49 BLE advertisement packets received in the 3 second time span. Most of the packets were received at the lowest interval, meaning there were no dropped packets.

Thus the tests indicate sufficient range with BLE radios.

In addition, two devices were evaluated using different antennas. One module used a PCB etched antenna while the other module used a BLE module with a chip antenna on-board.

The test revealed a better performance with the PCB antenna compared to the chip antenna.

A power consumption calculation for the tracking device 10 was done based on the following model:

1. The tracking device 10 will be in sleep mode by default.
2. The accelerometer 18 will be active.
3. The accelerometer 18 will wake up the processor 22 when movement is detected and the movement pattern must be considered by the processor.
4. The processor 22 will try to locate one or more mobile communication devices 26 via BLE from an internal list of previously registered "master" mobile devices.
   a. If successful the tracking device 10 will not enter into the distress mode.
   b. If unsuccessful the long range communication module 16 will send a LoRa status request to the server 44.
5. Processor 22 will then evaluate LoRa Rx for a recovery activation status from the server.
   a. If successful the processor 22 will transmit distress messages on the BLE radio interface 14.
   b. If unsuccessful, the processor 22 will continue to send LoRa status requests on the long range communication network, as well as trying to locate a known master mobile smartphone.
      i. If a known master mobile communication device is found, the system reverts to sleep state.
      ii. If a known master mobile communication device is not found, the processor 22 will continue to send LoRa status request.
6. On average, assume that the vehicle will be driven 4 times per day (i.e., 4 BLE phone verifications).
8. When stolen the BLE advertisement interval will be 20 ms+(0 to 10) ms.
9. The LoRa status request will be sent once every hour. When stolen the LoRa request interval will be set by the server.

The parameters of the system should be chosen so that the energy consumption of the device is very low and the battery would not need to be replaced for 5 years or more. This is feasible with current technology.

If BLE alone is used for tracking the efficiency would be proportional to the advertisement rate and would be even better.

Further testing carried out using the applicant's existing mobile telephone software application executing on driver's mobile telephones and some test devices 10 transmitting via Bluetooth were carried out.

The test was done using a crowd of about 80 000 mobile telephone users in an urban area (in Johannesburg, South Africa) and three test devices deployed in vehicles in constant distress mode.

The tags were detected on average between around 800 and 3000 times per day, which provides strong evidence for the effectiveness of the proposed invention in practice.

In addition to the above, the tracking device 10 in one example embodiment also captures driving data and transmits this back to the server 44.

An example of a "tag" device providing this functionality is described in the applicant's published PCT patent application number PCT/IB2014/065736, the contents of which are incorporated herein by reference.

In brief, the accelerometer 18 measures the acceleration of the tracking device 10 and thereby of the vehicle 12 when the vehicle is moving and reports the data to the microcontroller 22.

The tracking device 10 records acceleration and other sensor data. It streams that data to a mobile device 26 over the short-range wireless communication link, which will in turn process that data and transmits at least a portion of the received and processed data via communications network 32 to the server 44 as described in PCT patent application number PCT/IB2014/065736.

With the telematics functionality incorporated into the tracking device 10, it will be appreciated that a tag is provided which can provide both driver monitoring functionality as well as tracking functionality. It is, of course, also possible two or more such devices (tags and tracking devices) to concurrently be operational in a vehicle. It may even be desirable to have separate devices for stolen vehicle tracking and for driver quality measurement.

Thus the present invention provides an improved tracking device and tracking system potentially combined with the ability to measure the driving behaviour for the vehicle.

What is claimed is:

1. A tracking device comprising:
   a Bluetooth Low Energy (BLE) wireless communication module;
   a long range wireless communication module;
   an accelerometer; and
   a controller connected to the BLE wireless communication module and to the accelerometer so that when a vehicle to which the tracking device is connected moves, the movement is detected by the accelerometer and in response thereto the controller waits for a period of time to receive an authentication confirmation message from a smartphone located in a vehicle, within range of the tracking device, and belongs to an owner or other authorized user of the vehicle, if the authentication confirmation message fails to be received within the period of time the controller controls
   i) the BLE wireless communication module to periodically transmit distress messages for reception by other smartphones within range and located outside the vehicle that are capable of receiving the distress messages and are within range and located outside the vehicle; and
   ii) the long range wireless communication module to periodically transmit a status update.

2. The tracking device according to claim 1, wherein the long range wireless communication module is a LoRa (Low Energy Long Range) wireless communication protocol over a low power wireless network or a cellular network.

3. The tracking device according to claim 2, wherein the tracking device receives via the long range communication module an activate message from a tracking server and in response thereto the controller activates the BLE wireless communication module to transmit periodic distress messages via the BLE wireless communications module.

4. The tracking device according to claim 1, wherein the tracking device further comprises a memory for storing a unique identifier of the tracking device, and wherein the BLE wireless communication module periodically transmit distress messages with the unique identifier of the tracking device.

5. The tracking device according to claim 4, wherein the accelerometer measures the acceleration of the tracking device and thereby of the vehicle and stores acceleration data in the memory, and wherein the controller controls the BLE wireless communication module to transmit a sequence of time stamped acceleration data to a mobile communications device.

6. The tracking device according to claim 5, wherein the tracking device also provides driving behaviour data.

7. The tracking device according to claim 1, wherein the other smartphones each contain a location module for reporting location information and the distress messages to a server.

8. A tracking device including:
   a short range wireless communication module;
   a long range wireless communication module;
   an accelerometer; and
   a controller connected to the short range wireless communication module and to the accelerometer so that when an a vehicle to which the tracking device is connected moves, the movement is detected by the accelerometer and in response thereto the controller waits for a period of time to receive an authentication confirmation message from a smartphone located in a vehicle, within range of the tracking device, and belongs to an owner or other authorized user of the vehicle, if no authentication confirmation message is received within the period of time the controller controls
   i) the short range wireless communication module to periodically transmit distress messages to other smartphones within a transmission threshold of the short range wireless communication module and located outside the vehicle, wherein the other smartphones that are capable of receiving the distress messages and the other smartphones each contain a location module for reporting the location information along with the distress messages to a server; and
   ii) the long range wireless communication module to periodically transmit a status update.

9. The tracking device of claim 8, wherein controlling the short range wireless communication module to periodically transmit distress messages is further in response to the controller determining that an authentication confirmation message comprising data authenticated by a remote server fails to have been received from the smartphone located within the vehicle within the period of time.

10. The tracking device of claim 8, wherein after at least a first distress message has been transmitted the controller determines if the authentication confirmation message has been received from the smartphone located within the vehicle, where
    in response to determining that the authentication confirmation message has been received from the smartphone located within the vehicle, the controller suppresses the periodic transmission of the distress messages, and
    in response to determining that the authentication confirmation message fails to have been received from the smartphone located within the vehicle, the controller continues the periodic transmission of the distress messages.

11. The tracking device of claim 8, wherein the controller further generates a single-use identifier and sends it to the smartphone located within the vehicle as part of an authentication process between the tracking device and the smartphone located within the vehicle, and the single-use identifier is valid for a duration of a connection between the controller and the smartphone located within the vehicle.

12. The tracking device of claim 11, wherein the controller further generates a single-use identifier and sends it to the smartphone located within the vehicle as part of an authentication process between the tracking device and the smartphone located within the vehicle, and the single-use identifier is valid for a duration of a connection between the controller and the smartphone located within the vehicle.

13. The tracking device of claim 12, wherein the authentication process between the tracking device and the smartphone located within the vehicle further includes the smartphone located within the vehicle signing, before sending to the server, the single-use identifier with a symmetric key shared by a server and the tracking device.

14. The tracking device of claim 13, wherein the authentication process between the tracking device and the smartphone located within the vehicle further includes the smartphone located within the vehicle hashing, before sending to the server, the single-use identifier with the symmetric key.

15. The tracking device of claim 8, wherein the short range wireless communication module is a Bluetooth Low Energy (BLE) wireless communication module and a location of the tracking device is determined by the location module of the other smartphones and without the use of a location module in the tracking device.

16. A tracking device comprising:
a Bluetooth Low Energy (BLE) wireless communication module;
an accelerometer; and
a controller connected to the BLE wireless communication module and to the accelerometer so that when a vehicle to which the tracking device is connected moves, the movement is detected by the accelerometer and in response thereto the controller waits for a period of time to receive an authentication confirmation message from a smartphone located in a vehicle, within range of the tracking device, and belongs to an owner or other authorized user of the vehicle, if the authentication confirmation message fails to be received within the period of time the controller controls the BLE wireless communication module to periodically transmit distress messages for reception by other smartphones within range and located outside the vehicle that are capable of receiving the distress messages and are within range and located outside the vehicle, wherein the controller further generates a single-use identifier and sends it to the smartphone located within the vehicle as part of an authentication process between the tracking device and the smartphone located within the vehicle, and the single-use identifier is valid for a duration of a connection between the controller and the smartphone located within the vehicle.

17. The tracking device according to claim 16, wherein the authentication process between the tracking device and the smartphone located within the vehicle further includes the smartphone located within the vehicle sending the single-use identifier to a server.

18. The tracking device according to claim 17, wherein the authentication process between the tracking device and the smartphone located within the vehicle further includes the smartphone located within the vehicle signing, before sending to the server, the single-use identifier with a symmetric key shared by the server and the tracking device.

19. The tracking device according to claim 18, wherein the authentication process between the tracking device and the smartphone located within the vehicle further includes the smartphone located within the vehicle hashing, before sending to the server, the single-use identifier with the symmetric key.

* * * * *